United States Patent [19]
Herbst et al.

[11] Patent Number: 4,871,446
[45] Date of Patent: Oct. 3, 1989

[54] CATALYTIC CRACKING PROCESS EMPLOYING MIXED CATALYST SYSTEM

[75] Inventors: Joseph A. Herbst, Turnersville; Hartley Owen, Belle Mead, both of N.J.; Paul H. Schipper, Wilmington, Del.

[73] Assignee: Mobile Oil Corporation, New York, N.Y.

[21] Appl. No.: 92,243

[22] Filed: Sep. 2, 1987

Related U.S. Application Data

[63] Continuation-in-part of Ser. No. 903,186, Sep. 3, 1986, abandoned, which is a continuation-in-part of Ser. No. 903,351, Sep. 3, 1986, abandoned, which is a continuation-in-part of Ser. No. 903,189, Sep. 3, 1986, abandoned.

[51] Int. Cl.⁴ .................. C10G 11/18; C10G 37/02
[52] U.S. Cl. .................. 208/152; 208/158; 208/74; 208/113
[58] Field of Search .......... 208/153, 157, 113, 152, 208/73–70, 144, 145, 111, 120, 111 MC, 120 MC, 158; 422/140, 144

[56] References Cited

U.S. PATENT DOCUMENTS

| | | | |
|---|---|---|---|
| 3,380,911 | 4/1968 | Owen | 208/74 |
| 3,617,497 | 11/1971 | Bryson et al. | 208/80 |
| 3,748,251 | 7/1973 | Demmel et al. | 208/74 |
| 3,849,291 | 11/1974 | Owen | 208/78 |
| 3,894,931 | 7/1975 | Nace et al. | 208/73 |
| 3,894,932 | 7/1975 | Owen | 208/74 |
| 3,894,933 | 7/1975 | Owen et al. | 208/77 |
| 3,894,934 | 7/1975 | Owen et al. | 208/78 |
| 3,894,935 | 7/1975 | Owen | 208/78 |
| 3,926,778 | 12/1975 | Owen et al. | 208/74 |
| 3,928,172 | 12/1975 | Davis et al. | 208/77 |
| 3,974,062 | 8/1976 | Owen | 208/74 |
| 4,090,948 | 5/1978 | Schwarzenbek | 208/74 |
| 4,116,814 | 9/1978 | Zahner | 208/78 |
| 4,287,088 | 9/1981 | Sirkar | 252/414 |
| 4,309,279 | 1/1982 | Chester et al. | 208/120 |
| 4,368,114 | 1/1983 | Chester et al. | 208/120 |
| 4,422,925 | 12/1983 | Williams et al. | 208/75 |
| 4,490,241 | 12/1984 | Chou | 208/75 |
| 4,717,466 | 1/1988 | Herbst et al. | 208/113 |

FOREIGN PATENT DOCUMENTS

0148024 12/1984 European Pat. Off. .

*Primary Examiner*—Glenn Caldarola
*Attorney, Agent, or Firm*—Alexander J. McKillop; Charles J. Speciale; Richard D. Stone

[57] ABSTRACT

A catalytic cracking process is disclosed which comprises catalytically cracking a hydrocarbon charge stock in a catalytic cracking unit possessing at least one reaction zone, stripping zone and catalyst regeneration zone to provide a gasiform product employing as catalyst a mixed catalyst system which comprises, as a first catalyst component, particles of a cracking catalyst which requires relatively frequent regeneration and is relatively hydrothermally stable, and as a second catalyst component, particles of a catalyst which requires less frequent regeneration than the first catalyst component, physical characteristic(s) of particles of first catalyst component differing sufficiently from physical characteristic(s) of particles of second catalyst component as to permit their separation in the stripping zone.

11 Claims, 5 Drawing Sheets

CATALYTIC CRACKING PROCESS EMPLOYING MIXED CATALYST SYSTEM

CROSS-REFERENCE TO RELATED APPLICATIONS

This is a continuation-in-part application of U.S. patent applications Ser. Nos. 903,186, abandoned, 903,351 abandoned, and 903,189, abandoned, each of which was filed on Sept. 3, 1986, and each of which is relied upon and is incorporated by reference herein.

FIELD OF THE INVENTION

This invention relates to a catalytic cracking process and apparatus employing a mixed catalyst system. Further the invention relates to a catalytic cracking process employing a mixed catalyst system comprising, as a first component thereof, an amorphous and/or large pore crystalline cracking catalyst such as zeolite Y and, as a second component thereof, a medium pore shape selective crystalline silicate zeolite such as ZSM-5 and, more particularly, to such a process featuring selective reactivation of the second catalyst component. The invention also relates to a catalytic cracking process employing at least one riser reactor, at least one stripping unit and at least one catalyst regenerator and utilizing a mixed catayst system comprising, as a first component, an amorphous cracking catalyst and/or a large pore crystalline zeolite cracking catalyst, e.g., zeolite Y, and, as a second component, a shape selective medium pore crystalline silicate zeolite catalyst, e.g., zeolite ZSM-5. The catalytic cracking process of this invention further features the selective reactivation and pre-acceleration of the second catalyst component in a lower region of the riser with a suitable reactivating medium such as a hydrogen-rich and/or light hydrocarbon gas prior to combining said catalyst component with the first catalyst component and a heavy hydrocarbon feed in an upper region of the riser where cracking of the feed to gasoline boiling range material and light hydrocarbons is effected.

BACKGROUND OF THE INVENTION

In known and conventional fluidized catalytic cracking processes, a relatively heavy hydrocarbon feedstock, e.g., a gas oil, admixed with a suitable cracking catalyst, e.g., a large pore crystalline silicate zeolite such as zeolite Y, to provide a fluidized suspension is cracked in an elongated reactor, or riser, at elevated temperature to provide a mixture of lighter hydrocarbon products. The gasiform reaction products and spent catalyst are discharged from the riser into a separator, e.g., a cyclone unit, located within the upper section of an enclosed stripping vessel, or stripper, with the reaction products being conveyed to a product recovery zone and the spent catalyst entering a dense catalyst bed within the lower section of the stripper. In order to remove entrained hydrocarbon product from the spent catalyst prior to conveying the latter to a catalyst regenerator unit, an inert stripping gas, e.g., steam, is passed thriough the catalyst where it desorbs such hydrocarbons conveying them to the product recovery zone. The fluidized catalyst is continuously circulated between the riser and the regenerator and serves to transfer heat from the latter to the former thereby supplying the thermal needs of the cracking reaction which is endothermic.

Particular examples of such catalytic cracking processes are disclosed in U.S. Pat. Nos. 3,617,497, 3,894,932, 4,309,279 and 4,368,114 (single risers) and U.S. Pat. Nos. 3,748,251, 3,849,291, 3,894,931, 3,894,933, 3,894,934, 3,894,935, 3,926,778, 3,928,172, 3,974,062 and 4,116,814 (multiple risers).

Several of these processes employ a mixture of catalysts having different catalytic properties as, for example, the catalytic cracking process described in U.S. Pat. No. 3,894,934 which utilizes a mixture of a large pore crystalline silicate zeolite cracking catalyst such as zeolite Y and shape selective medium pore crystalline silicate zeolite such as ZSM-5. Each catalyst contributes to the function of the other to produce a gasoline product of relatively high octane rating.

In this and other fluidized catalytic cracking operations employing mixtures of large and medium pore size crystalline silicate zeolite catalysts where catalyst seprated from the product effluent is conveyed to a stripper and from there to a catalyst regenerating zonek regardless of the nature of the catalyst introduction at start-up, once steady-state operation has been achieved, the two types of catalyst will become fairly uniformly mixed and will circulate throughout the system at or about the same rate. This arrangement is subject to a significant disadvantage. While the large pore zeolite cracking catalyst cokes up relatively quickly and must therefore be regenerated at frequent intervals, this is not the case with the medium pore zeolite catalysts which can maintain their catalytic activity over many more cycles of operation. However, since the large and medium pore zeolite catalysts are in intimate admixture, heretofore there has been no practical means of conveying only the large pore zeolite catalyst to the catalyst regenerator unit or, what amounts to the same thing, keeping the medium pore zeolite catalyst, or at least most of it, on the average out of the regenerator.

Thus, a principal disadvantage resulting from the use of mixed catalyst systems in known fluidized catalytic cracking operations is owing to the fact that the medium pore zeolite component is subjected to the harsh hydrothermal conditions of the ctalyst regenerator unit even though it does not require regeneration anywhere near the rate at which the large pore zeolite cracking component must be regenerated. The medium pore zeolite catalyst is therefore needlessly subjected to hydrothermal deactivation at a much greater rate than is necessary for it to function.

U.S. Pat. No. 4,116,814 describes a multiople riser fluidized catalytic cracking operation utilizing a mixture of large and medium pore crystalline zeolite catalysts which differ in particle size and/or density as to facilitate their separation in a common catalyst regeneration unit. There is, however, no hint in this patent of preventing the transfer or reducing the rate of circulation of medium pore crystalline zeolite to and through the catalyst regeneration unit.

U.S. Pat. No. 4,287,088 describes a process and system for the segregation of used contaminated catalyst into fractions according to particle density differences. No mention is made of mixed catalyst systems.

SUMMARY OF THE INVENTION

It is an object of the invention to provide a catalyst cracking process for the conversion of a hydrocarbon charge stock to lighter products, e.g., gasoline, distillate and light olefins, employing a mixed catalyst system.

It is a particular object of the present invention to provide a catalytic cracking process featuring at least one hydrocarbon conversion reaction zone, stripping zone and catalyst regeneration zone and employing a mixed catalyst system comprising, as a first catalyst component, a catalyst which requires relatively frequent regeneration and, as a second catalyst component, a catalyst which requires regeneration less frequently than the first catalyst component, physical characteristic(s) of particles of first catalyst component differing sufficiently from physical characteristic(s) of particles of second catalyst component as to permit their separation within the stripping zone, and optionally, to prolong the residency time of particles of second catalyst component in the reaction zone, the overall result being a reduction in the rate of circulatiin of particles of second catalyst component through the regeneration zone, and, consequently, a conservation of the catalytic activity of this component.

It is a further object of the invention to provide such a catalytic cracking process featuring one or more riser reactors operated under fluidized bed conditions, the first catalyst component being an amorphous cracking catalyst and/or large pore crystalline cracking catalyst such as zeolite X, Y, REY, USY, RE-USY, etc., and the second catalyst component being zeolite Beta and/or a shape selective medium pore crystalline silicate zeolite such as ZSM-5, ZSM-11, ZSM-12, ZSM-23, ZSM-38, ZSM-48, etc., the density, size and/or shape of the first catalyst component resulting in a settling rate $R_1$ and the density, size and/or shape of the second catalyst component resulting in a settling rate $R_2$, there being a sufficient difference between $R_1$ and $R_2$ as to facilitate separation of particles of first catalyst component from particles of second catalyst component in the stripping zone and, optionally, to prolong the residency time of particles of second catalyst component in the riser.

It is still another object of the invention to provide an improved fluidized catalytic cracking apparatus.

In keeping with the foregoing objects, a catalytic cracking process is provided which comprises:
(a) catalytically cracking a hydrocarbon charge stock in a catalytic cracking unit possessing at least one reaction zone, stripping zone and catalyst regeneration zone to provide a gasiform product employing as catalyst a mixed catalyst system which comprises, as a first catalyst component, particles of a cracking catalyst which requires relatively frequent regeneration and, as a second catalyst component, particles of a catalyst which requires less frequent regeneration than the first catalyst component, physical characteristic(s) of particles of first catalyst component differing sufficiently from physical characteristic(s) of particles of second catalyst component as to permit their separation in the stripping zone;
(b) separating particles of spent first catalyst component from particles of second catalyst component in the stripping zone;
(c) stripping the first and second catalyst components;
(d) conveying stripped, spent first catalyst component to the regeneration zone where said catalyst undergoes regeneration;
(e) conveying regenerated first catalyst component to a reaction zone; and,
(f) conveying stripped second catalyst component to a reaction zone.

In keeping with the foregoing objects, another aspect of the invention is a catalytic cracking process which comprises:
(a) catalytically cracking a hydrocarbon charge stock in a catalytic cracking unit processing unit at least one reaction zone stripping zone and catalyst regeneration zone to provide a gasiform product employing a mixed catalyst system which comprises, as a first catalyst component, particles of an amorphous cracking catalyst and/or a large pore crystalline cracking catalyst and, as a second catalyst component, particles of a shape selective medium pore crystalline silicate zeolite catalyst which requires less frequent regeneration than the first catalyst component, physical characteristics(s) of particles of first catalyst component differing sufficiently from physical characteristic(s) of particles of second catalyst component as to permit their separation in the stripping zone;
(b) separating particles of spent first catalyst component from particles of second catalyst component in the stripping zone;
(c) stripping the separated particles of first catalyst component;
(d) conveying stripped, spent first catalyst component to the regeneration zone, the catalyst undergoing regeneration therein;
(e) conveying regenerated first catalyst component to a reaction zone;
(f) conveying stripped or non-stripped separated particles of second catalyst component to a reactivation zone, the catalyst undergoing reactivation therein; and,
(g) conveying reactivated second catalyst component to a reaction zone.

In keeping with the foregoing objects, there is also provided a catalytic cracking process possessing at least one riser in association with at least one stripping unit and at least one regenerator which comprises:
(a) converting a heavy hydrocarbon feed in an upper region of the riser in the presence of a mixed catalyst composition comprising, as a first catalyst component, particles of an amorphous cracking catalyst and/or a large pore crystalline zeolite cracking catalyst and, as a second catalyst component, particles of a shape selective medium pore crystalline silicate zeolite catalyst, to provide gasoline boiling range material and light hydrocarbons, physical characteristic(s) of particles of first catalyst component differing sufficiently from physical chracteristic(s) of particles of second catalyst component as to permit their separation in the stripping unit, and, optionally, to prolong the residency time of second catalyst particles in one or more regions of the riser compared to the residency time of first catalyst particles therein;
(b) separating particles of spent first catalyst component from particles of second catalyst component in the stripping unit;
(c) stripping the separated particles of first catalyst component;
(d) conveying stripped, spent first catalyst component to the regenerator, the catalyst undergoing regeneration therein;
(e) conveying hot regenerated first catalyst component to the upper region of the riser;

(f) conveying stripped or non-stripped separated particles of second catalyst component to a lower region of the riser; and, (g) reactivating and simultaneously pre-accelerating particles of second ctalyst component in the lower region of the riser, and in the case of non-stripped particles of second catalyst component, stripping the same, employing a gasiform reactivating medium, the resulting reactivated second catalyst component combining with hot regenerated first catalyst component and heavy hydrocarbon feed in the upper region of the riser to effect another cycle of conversion in accordance with step (a).

The term "catalyst" as used herein shall be understood to apply not only to a catalytically active material but to one which is composited with suitable matrix component which may or may not be catalytically active.

The foregoing catalytic cracking process does much to overcome a major drawback of known and conventional catalytic cracking processes employing mixed catalyst systems in which both catalyst components circulate through the catalyst regeneration zone at about the same rate. As applied, for example, to a fluidized catalytic cracking process in which a cracking catalyst requiring frequent regeneration such as zeolite Y is employed in combination with a shape selective medium pore crystalline silicate zeolite catalyst requiring comparatively infrequent regeneration such as ZSM-5, the present invention makes it possible to sustain high levels of activity of the latter ctalyst for much longer average periods than would otherwise be the case due to the reduced incidence of its exposure to the catalyst-degrading environment of the regenerator zone. This, in turn, permits the refiner to take greater advantage of the unique catalytic capabilities of ZSM-5 in a catalytic cracking operation.

DESCRIPTION OF THE PREFERRED EMBODIMENTS

Conventional cracking catalyst components are generally amorphous silica-alumina and crystalline silica-alumina. Other materials said to be useful as cracking catalysts are the crystalline silicoaluminophosphates of U.S. Pat. No. 4,440,871 and the crystalline metal aluminophosphates of U.S. Pat. No. 4,567,029.

However, the major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

It is, of course, within the scope of this invention to employ two or more of the foregoing amorphous and/or large pore crystalline cracking catalysts as the first catalyst component of the mixed catalyst system. It is further contemplated that the entire mixed catalyst system can be made up solely of two or more amorphous and/or large pore crystalline silicate cracking catalysts provided at least one catalyst requires frequent regeneration (the first catalyst component) and another catalyst in the system needs regeneration only on a relatively infrequent basis (the second catalyst component). Thus, for example, a mixed catalyst system in accordance with the invention can be made up of zeolite Y, a catalyst which requires frequent regeneration and zeolite Beta, a catalyst which need not be regenerated as frequently as zeolite Y. Preferred large pore crystalline silicate zeolite components include the synthetic zeolites mordenite and faujasite and the synthetic zeolites X and Y with particular preference being accorded zeolites Y, REY, USY and RE-USY, and mixtures thereof.

The shape selective medium pore crystalline silicate zeolite catalyst constituting the second catalyst component of the mixed catalyst system is exemplified by ZSM-5, ZSM-11, ZSM-12, ZSM-23, ZSM-35, ZSM-38, ZSM-48 and other similar materials. U.S. Pat. No. 3,702,886 describing and claiming ZSM-5 is incorporated herein by reference. Also, U.S. Reissue Pat. No. 29,948 describing and claiming a crystalline material with an X-ray diffraction pattern of ZSM-5 is incorporated herein by reference as is U.S. Pat. No. 4,061,724 describing a high silica ZSM-5 referred to as "silicalite" therein.

ZSM-11 is more particularly described in U.S. Pat. No. 3,709,979, the entire contents of which are incorporated herein by reference.

ZSM-12 is more particularly described in U.S. Pat. No. 3,832,449, the entire contents of which are incorporated herein by reference.

ZSM-23 is more particularly described in U.S. Pat. No. 4,076,842, the entire contents of which are incorporated herein by reference.

ZSM-35 is more particularly described in U.S. Pat. No. 4,016,245, the entire contents of which are incorporated herein by reference.

ZSM-38 is more particularly described in U.S. Pat. No. 4,046,859, the entire contents of which are incorporated herein by reference.

ZSM-48 is miore particularly described in U.S. Pat. No. 4,375,373, the entire contents of which are incorporated herein by reference.

The preferred shape selective medium pore crystalline silicate zeolite components of the mixed catalyst system herein are ZSM-5, ZSM-11, ZSM-12, ZSM-23, ZSM-35 and ZSM-38, with ZSM-5 being particularly preferred.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and any other trivalent metal which is heavier than aluminum. Specific examples of such catalysts include ZSM-5 and zeolite Beta containing boron, gallium and/or titanium. In lieu of, or in addition to, being incorporated into the zeolite framework, these and other catalytically active elements can also be deposited upon the zeolite by any suitable procedure, e.g., impregnation.

Separation of particles of first catalyst component from particles of second catalyst component in the stripping unit can be accomplished in several ways. For example, the two components can be provided in such different average particle sizes that they can be readily sorted within a stripping unit possessing suitable sieving means, an arrangement more particularly described in connection with the dual riser fluidized catalytic cracking unit illustrated in FIG. 2, infra.

Figure 3:
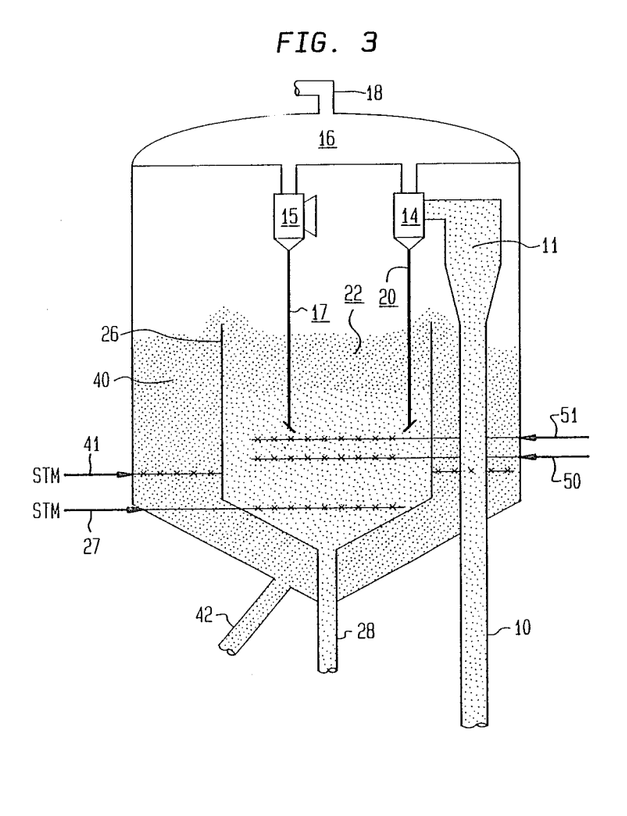
Figure 4:
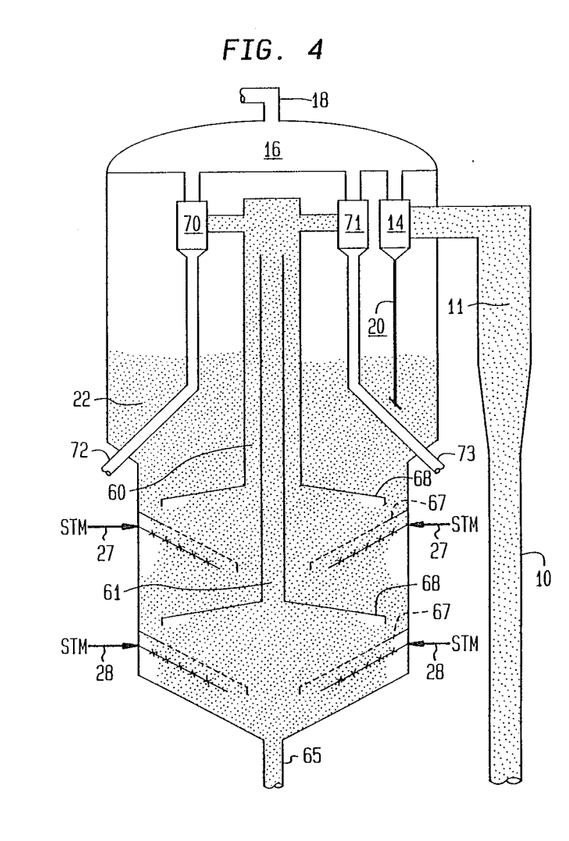
Figure 5:
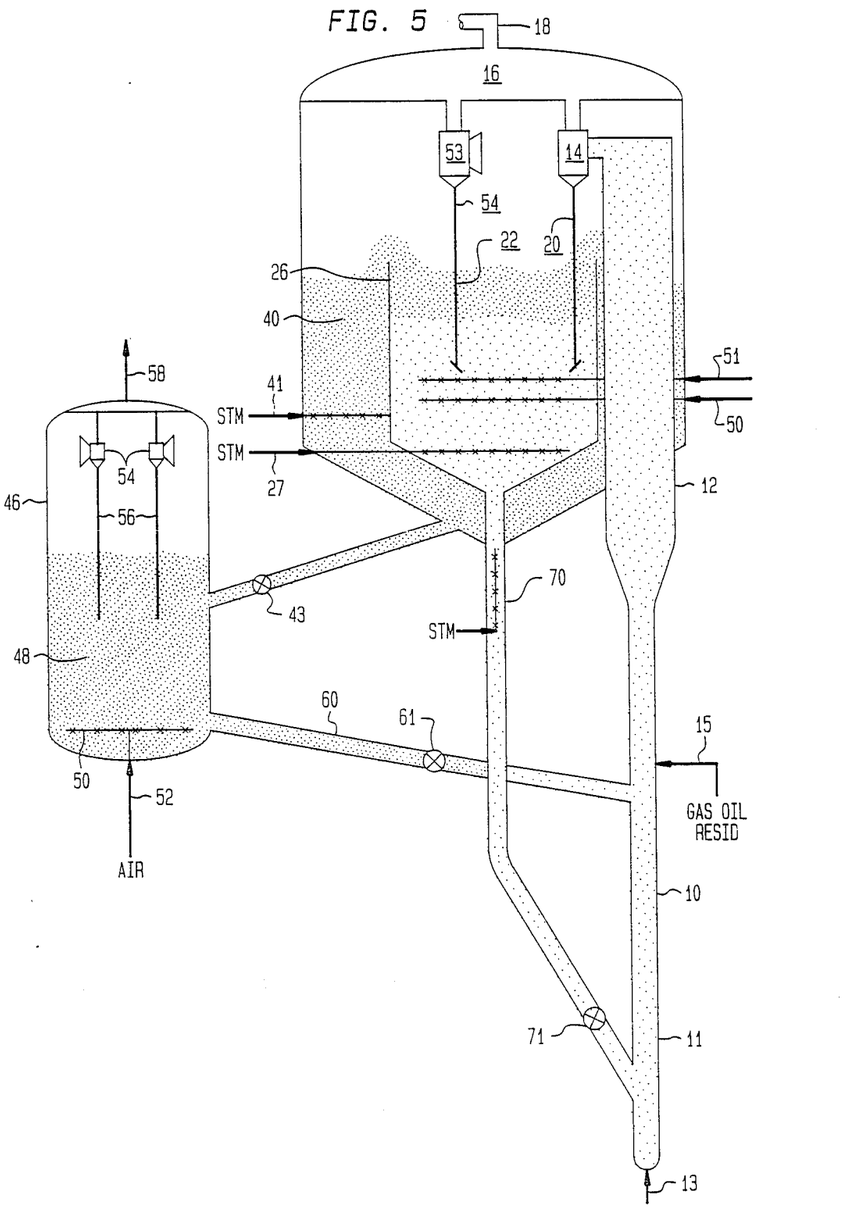
Figure 6:
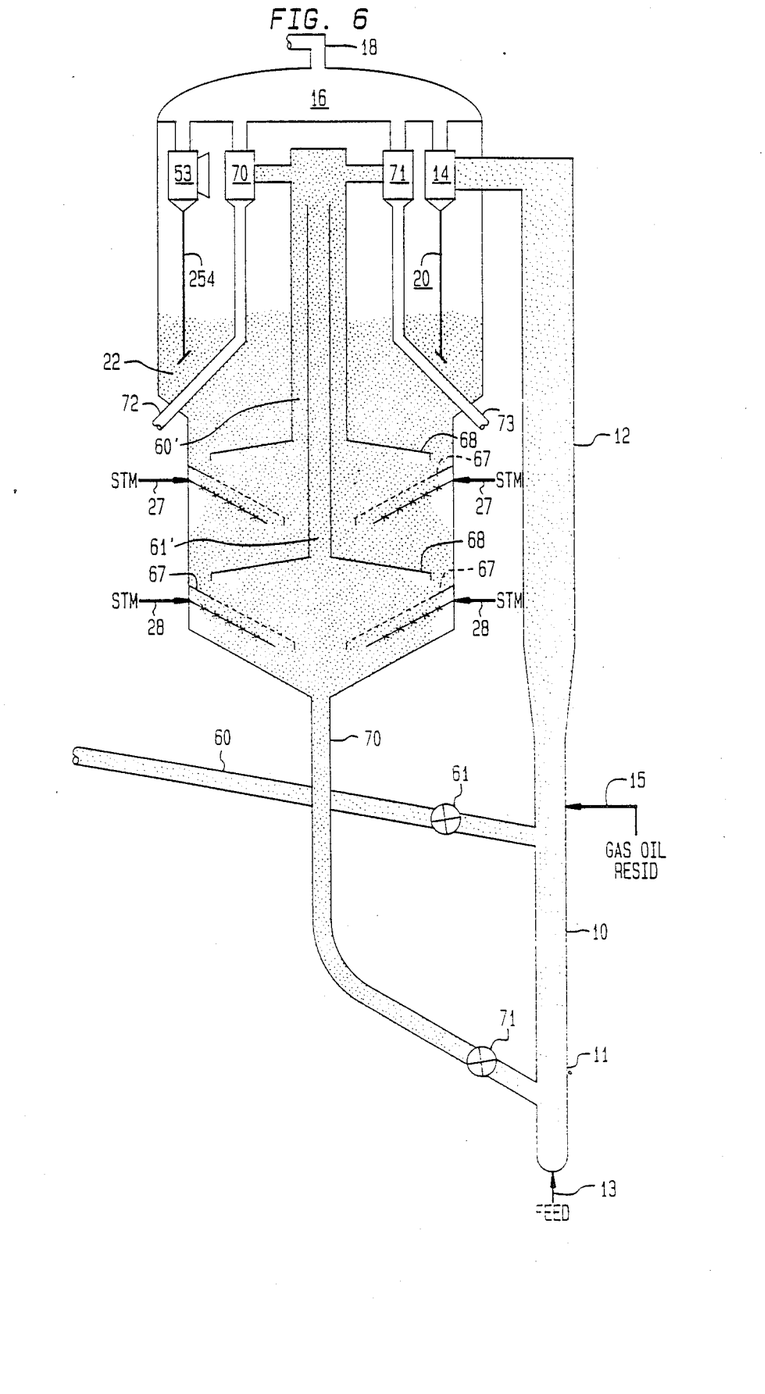

Separation within the stripping zone can also be achieved by classifying the first and second catalyst components according to their average particle densities which can be made to be significantly different in various ways including by appropriate selection of the matrix components with which they are composited as more fully explained below. In general, smaller, less dense catalyst particles will tend on the average to define an upper phase within the stripper floating upon larger, more dense catalyst particles which, conversely, will tend on the average to define a lower phase within the stripper.

Where separation of catalyst particles is based largely on differences in density, several techniques can be used to effect their separation, such being described more fully, infra, in connection with the stripping unit embodiments shown in FIGS. 3 and 4.

It is, of course, within the scope of this invention to effect separation of catalyst particles either before or after the stripping operation is carried out.

In a preferred embodiment of this invention, the characterizing physical properties of the first and second catalyst components are so selected that they each will exhibit different settling rates, designated $R_1$ and $R_2$ respectively, which permit the catalyst particles having the greater settling rate (advantageously, the second catalyst component) to remain within the riser reaction zone longer than the catalyst particles having the lower settling rate. Residency time of catalyst particles in a riser is primarily dependent on two factors: the linear velocity of the fluid stream within the riser which tends to carry the entire catalyst bed/conversion products/unconverted feed up and out of the riser into the separator unit and the opposing force of gravity which tends to keep the slower moving catalyst particles within the riser. Ordinarily, in a mixed catalyst system, both catalyst components will circulate through the system at about the same rate. As previously pointed out, this has proven disadvantageous to the efficiency of the system since the medium pore zeolite catalyst or other catalyst component which does not require as frequent regeneration as the cracking catalyst will be needlessly subjected to the catalyst-degrading conditions of the regenerator with the result that its useful catalytic life will be shortened. However, in accordance with this invention, it is possible to retain the less coke deactivated catalyst within the riser, even to the point where, because of a balance between the upward velocity of this catalyst component and its settling rate, it can be made to remain more or less stationary, or suspended, at any desired level within the riser defining a zone of concentration therein. To bring about this balance or to otherwise prolong the residency time of a particular componentof the mixed catalyst system within the riser, the average density, particle size and/or shape of the catalyst particles can be adjusted in a number of ways as to provide the desired settling characteristics. As a general guide, as the average particle size of the catalyst increases and/or its average particle density increases, the residencey time of the catalyst will increase.

Assuming, for example, this differential in $R_1$ and $R_2$ is accomplished by making the particles of the second catalyst component initially larger and of greater density than the particles of first catalyst component and perhaps even more irregular in shape than the latter, gradual attrition of the larger particles (through particle collision) will progressively reduce their capability for prolonged residency in the riser and as time goes on, increasing quantities of such particles will enter the stripping zone where, however, they can still be readily separated based on their different densities as later more fully explained. This arrangement, i.e., increased residency time in the riser coupled with separation in the stripping zone, maximizes the capability of the catalytic cracking process of this invention for reducing the rate of circulation of the less coke deactivated catalyst particles through the regenerator zone.

Among the techniques which can be used for making one catalyst component more dense than the other is compositing each catalyst with a matrix component of substantially different density. Useful matrix components include the following:

| matrix component | particle density (gm/cm$^3$) |
| --- | --- |
| alumina | 3.9–4.0 |
| silica | 2.2–2.6 |
| magnesia | 3.6 |
| beryllia | 3.0 |
| barium oxide | 5.7 |
| zirconia | 5.6–5.9 |
| titania | 4.3–4.9 |

Combinations of two or more of these and/or other suitable porous matrix components, e.g., silica-alumina, silica-magnesia, silica-thoria, silica-alumina-zirconia, etc., can be employed for a still wider spectrum of density values from which one may select a specific predetermined value as desired.

In general, selection of each matrix component will be such that the catalyst which is to have the lower rate of circulation through the regenerator will be more dense than the catalyst requiring frequent regeneration. For example, in the case of a mixed catalyst system containing medium pore and large pore crystalline silicate zeolites where it is desired to increse the residency time of the medium pore zeolite catalyst in the riser, the overall packed density of the medium pore zeolite catalyst particles inclusive of its matrix component can advantageously vary from about 0.6 to about 4.0 $gm/cm^3$, and preferably from about 2.0 to about 3.0 $gm/cm^3$, and the overall packed density of the large pore zeolite catalyst particles inclusive of its matrix component can advantageously vary from about 0.4 to about 1.1 $gm/cm^3$ density, and preferably from about 0.6 to about 1.0 $gm/cm^3$.

Another usful technique for adjusting the density of each catalyst component, again in the case of a mixture of medium and large pore zeolite catalyst, is to composite the medium pore zeolite catalyst particles with a material which tends to coke up faster than the particles of large pore zeolite catalyst, such resulting in an increase in the density of the former in situ. Illustrative of such materials are hydrated alumina which in situ forms a transition alumina which has a high coking rate. This embodiment possesses several additional advantages. In the coked-up state, the composited medium pore silicate zeolite catalyst is more resistant to attrition which results from collision with other particles in the riser. The individual catalyst particles can sustain more collisions and thus serve as a practical means of adjusting the velocity of the large pore zeolite catalyst particles through the riser (the latter in colliding with the medium pore zeolite particles will, as a result, have reduced velocity). In addtion, the coked-up composited medium pore zeolite catalyst particles will tend to accumulate metals present in the feed.

As previously stated, the relative settling rate of each catalyst component can be selected by varying the average particle size of the catalyst particles. This can be readily accomplished at the time of compositing the catalyst particles with various matrix components. As between two catalyst components of significantly different average particle size, the larger will tend to remain within the riser longer than the smaller. Where it is desired to increase the residency time, say, of the medium pore zeolite catalyst particles in the riser over that of the large pore zeolite catalyst component, the average particle size of the former will usually be larger than that of the latter. So, for example, the average particle size of the medium pore zeolite catalyst particles can be made to vary from about 500 microns to about 70,000 microns, and preferably from about 1000 to about 25,000 microns while the average particle size of the large pore zeolite catalyst particles can be made to vary from about 20 to about 150 microns, and preferably from about 50 to about 100 microns.

The shape, or geometric configuration, of the catalyst particles also affects their relative settling rates, the more irregular the shape (i.e., the more the shape deviates from a sphere), the longer the residency time of the particles in the riser. Irregular-shaped particles can be simply and readily achieved by crushing the catalyst-matrix extrudate or using an extruded catalyst.

As will be appreciated by those skilled in the art, the settling rate for a particular catalyst component will result from the interaction of each of the three foregoing factors, i.e., density, average particle size and particle shape. The factors can be combined in such a way that they each contribute to the desired result. For example, the particles of the less coke deactivated catalyst can simultaneously be made denser, larger and more irregular in shape than the catalyst particles requiring frequent regeneration. However, a differential settling rate can still be provided even if one of the foregoing factors partially offsets another as would be the case where greater density and smaller average particle size coexist in the same catalyst particle. Regardless of how these factors of particle density, size and shape are established for a particular catalyst component, their combined effect will, of course, be such as to result in a significant differential in settling rates of the components comprising the mixed catalyst system of this invention.

By varying the cross sectional geometry of the riser, it is possible to further prolong the residency time therein of the denser, larger and/or more irregularly shaped catalyst particles. Numerous geometric configurations can be utilized to achieve this effect. So, for example, the riser can be made to flare outwardly for a part of its length. In one such arrangement (as shown in FIGS. 3 and 4, supra), some portion of the upper section of the riser can be flared outwardly. The denser, larger and/or more irregularly shaped particles will tend to occupy the flared region of the riser as to constitute a zone of concentration therein.

The shape selective medium pore crystalline silicate zeolite catalyst can be present in the mixed catalyst system over widely varying levels. For example, the zeolite concentratiin of the second catalyst can be present at a level as low as about 0.01 to about 1.0 weight percent of the total catalyst inventory (as in the case of the catalytic cracking process of U.S. Pat. No. 4,368,114)and can represent as much as 25 weight percent of the total catalyst system.

The catalytic cracking unit is preferably operated under fluidized flow conditions at a temperature within the range of from about 900° F. to about 1350° F., a first catalyst component to charge stock ratio of from about 2:1 to about 15:1 and a first catalyst component contact time of from about 0.5 to about 30 seconds. Suitable charge stocks for cracking comprise the hydrocarbons generally and, in particular, petroleum fractions having an initial boiling point range of at least 400° F., a 50% point range of at least 500° F. and an end point range of at least 600° F. Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperatures utilized herein are expressed in terms of convenience of the boiling point corrected to atmospheric pressure.

It is also contemplated to employ multiple riser catalytic cracking units such as any of the known dual riser systems referred to above.

Figure 1A:
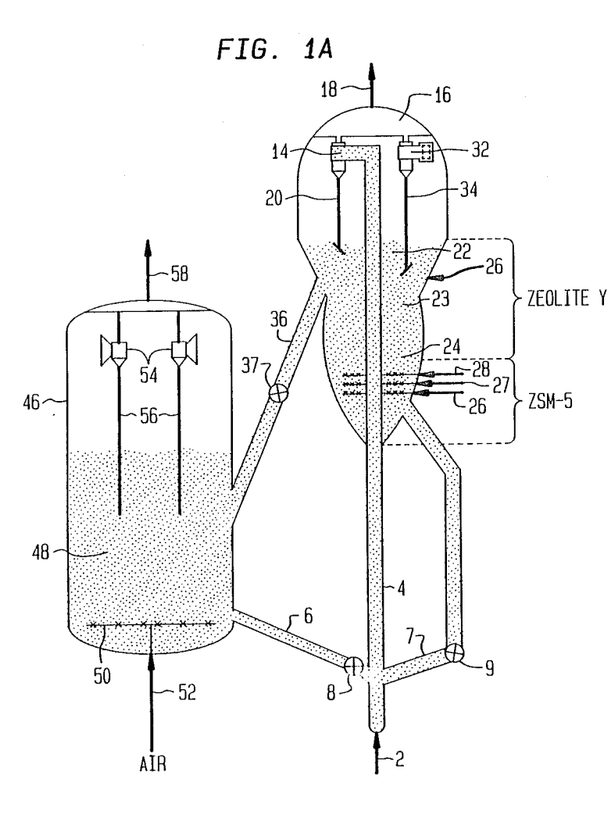
FIGS. 1A and 1B each schematically illustrates a fluidized catalytic cracking operation carried out in a single riser cracking unit in accordance with this invention.

Referring now to FIG. 1A, a hydrocarbon feed 2 such as gas oil boiling at from about 600° F. up to 1200° F. is conveyed following preheating to the bottom portion of riser 4 for admixture with hot regenerated catalyst, predominantly made up of zeolite Y, introduced by standpipe 6 provided with flow control valve 8, and ZSM-5 introduced by standpipe 7 provided with flow control valve 9. A suspension of the mixed catalysts in hydrocarbon vapors at a temperature of at least about 950° F. but more usually at least about 1000° F., is thus formed in the lower portion of riser 4 for flow upwardly therethrough under hydrocarbon conversion conditions. The suspension initially formed in the riser can be retained during flow through the riser for a first catalyst component residence time which is advantageously within the range of from about 0.5 to about 15 seconds. Both catalyst components together with the gasiform products of conversion are discharged from the top of the riser into one or more cyclonic separation zones adjacent the riser discharge as represented by cyclone separator 14. There may be a plurality of such cyclone separator units comprising first and second cyclonic separation means attached to or spaced apart from the riser discharge for separating catalyst particle from hydrocarbon vapors. Separated hydrocarbon vapors are passed from separator 14 to a plenum chamber 16 for withdrawal therefrom by conduit 18. These hydrocarbon vapors together with gasiform material separated by stripping gas as defined below are passed by conduit 18 to fractionation equipment not shown. Catalyst separated from hydrocarbon vapors in the cyclonic separation means is passed by diplegs represented by dipleg 20 to a dense fluid bed of separated catalyst 22 retained about an upper section of riser conversion zone 4. Catalyst bed 22 is maintained in stripper 26 as a downwardly moving fluid bed of catalyst counter-current to rising gasiform material. Due to the difference in settling rates $R_1$ and $R_2$ of the zeolite Y and ZSM-5 catalyst particles, the zeolite Y catalyst particles being smaller and less dense than the ZSM-5 catalyst particles, the former tend to form an upper phase 23 floating upon the latter which constitute the lower phase 24 of catalyst bed 22. While each phase contains some of the other catalyst, they will be made up primarily of one catalyst component or the other. A stripping gas, e.g., steam, nitrogen, light gas, etc. is added to lower catalyst phase 24 through conduit 26, its upward flow removing hydrocarbons entrained by the catalyst. The stripping gas with desorbed hydrocarbons passes through one or more cyclonic separating means 32 wherein entrained catalyst fines are separated and returned to the catalyst bed 22 by dipleg 34.

In order to enhance the overall efficiency of the operation, a light olefin feed, e.g., a gas rich in ethylene and/or propylene, can be introduced into lower ZSM-5 phase 24 through conduit 27 to produce higher weight products and an exotherm which improves the desorption efficiency of the stripping operation. In general, the quantity of light olefin feed should be such as to increase the temperature of the catalyst bed in this region by at least about 50° F., and preferably by at least about 100° F. To accomplish this, from about 0.5 to about 20, and preferably from about 1 to 10, weight percent of light olefin feed can be introduced into this phase by weight of total catalyst present in the stripper. Ordinarily, then, the temperature of the catalyst bed will increase from its usual range of about 880°-1150° F. to about 930°-1250° F. and even higher. This increase in spent catalyst bed temperature significantly enhances the stripping, or desorption, of hydrocarbons and, where present, sulfur compounds, which are entrained by the catalyst particles. Thus, in carrying out the foregoing improved stripping process, it is possible to increase the recovery of such entrained hydrocarbons by from about 5 to about 30 weight percent or more compared to substantially the same stripping procedure carried out in the absence of the exothermic conversion reaction herein. Optionally, where the light olefin feed in line 27 is predominantly made up of ethylene, one or more other highly reactive light olefins, e.g., propylene, butylene or mixtures thereof, can be introduced into the lower catalyst phase through a separate conduit 28 in order to take advantage of the high partial pressure of the ethylene contained in the feed stream introduced through line 27 located therebelow. Amounts of $C_3$ and/or $C_4$ olefin material ranging from about 0.1 to about 5, and preferably from about 0.2 to about 3, weight percent of the entire catalyst bed can be suitably employed.

Hot, stripped spent zeolite Y catalyst at an elevated temperature is withdrawn from upper phase 23 by conduit 36 equipped with valve 37 for transfer to a catalyst regeneration zone. Spent zeolite Y catalyst particles attain a relatively high level of hydrocarbonaceous material which is subsequently removed therefrom by regeneration with oxygen-containing regeneration gases. The stripped catalyst particles are passed by conduit 36 to a catalyst regeneration unit represented by regenerator 46 containing a dense fluid bed of catalyst 48. Regeneration gas such as air is introduced to the lower portion of regenerator 46 by air distributor 50 supplied by conduit 52. Cyclone separators 54 provided with diplegs 56 separate entrained catalyst particles from flue gases and return the separated catalyst to the fluid bed of catalyst. Flue gases pass from the cyclones into a plenum chamber and are removed therefrom by conduit 58. Hot regenerated zeolite Y catalyst is returned to the bottom of riser 4 by conduit 6 as discussed above to participate in another cycle of conversion.

Catalyst made up largely of ZSM-5 in the lower phase 24 of bed 22 is conveyed through conduit 7 equipped with valve 9 to the bottom of riser 4 where it combines with regenerated zeolite Y catalyst to catalyze another sequence of hydrocarbon conversion.

Figure 1B:
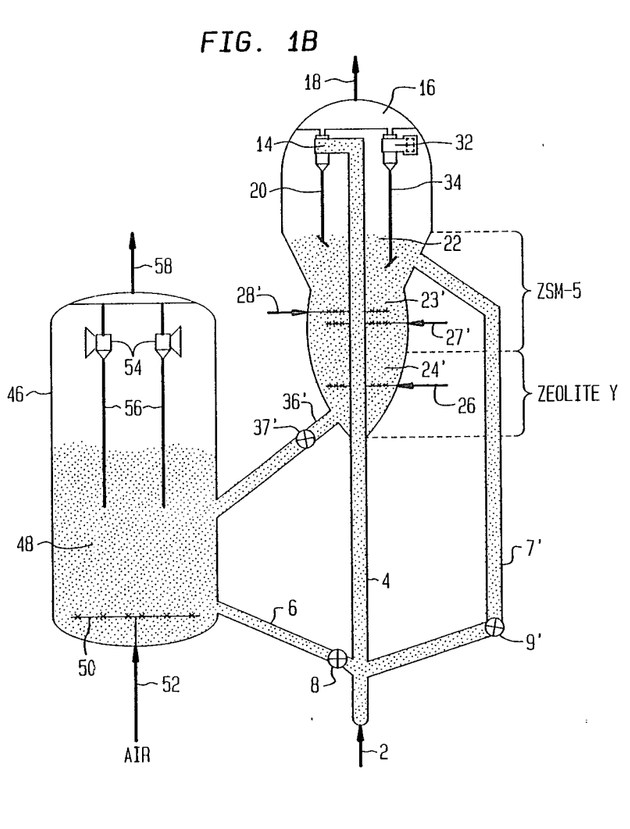

FIG. 1B illustrates a similar catalytic cracking operation as that described in connection with FIG. 1A except that now, the ZSM-5 catalyst particles are smaller and less dense than the zeolite Y catalyst particles thereby concentrating in upper phase 23' of the stripper while the larger, denser zeolite Y catalyst particles concentrate in the lower phase 24'. Stripped zeolite Y catalyst particles are conveyed to regenerator 46 through conduit 36' equipped with valve 37' while stripped ZSM-5 catalyst particles are conveyed to riser 4 through conduit 7' provided with valve 9'. The optional exotherm taking place in ZSM-5 catalyst upper phase 23' is carried out in essentially the same manner as described in connection with the process of FIG. 1A, the ethylene-rich feed being supplied to the upper ZSM-5 phase through conduit 27' and additional $C_3$ and/or $C_4$ olefin being introduced therein through conduit 28'.

Figure 2:
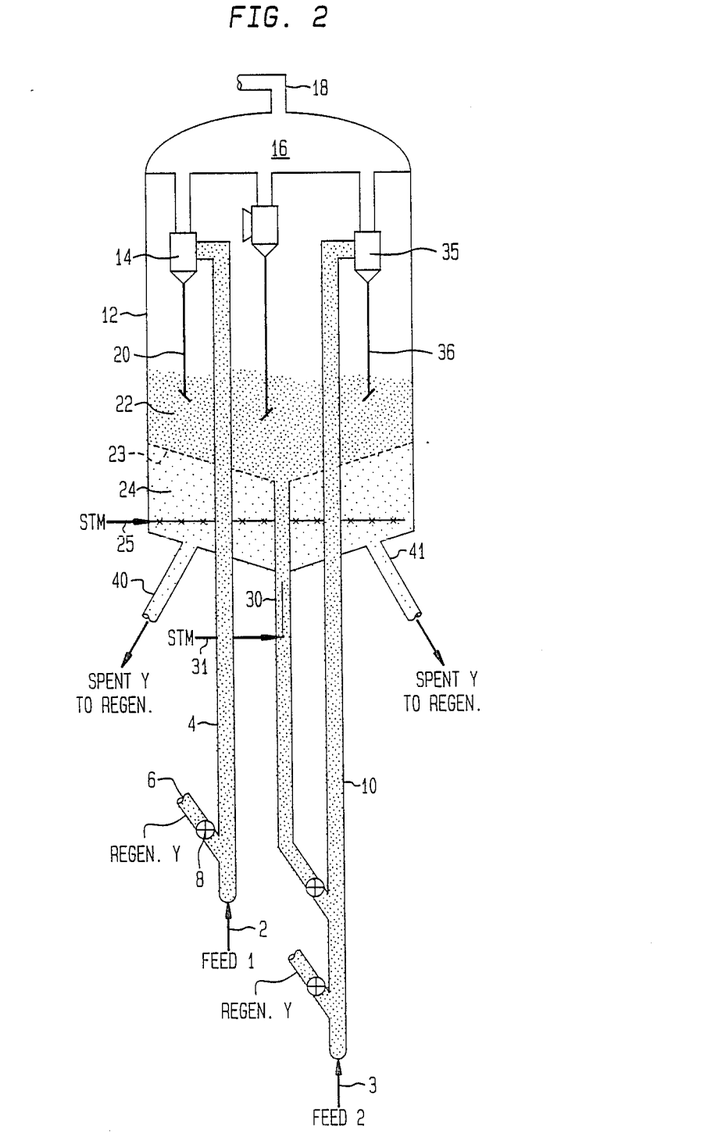
FIG. 2 schematically illustrates the fluidized catalytic cracking operation carried out in a multiple (dual) riser cracking unit, the stripper featuring means for separating the catalyst components based primarily on differences in their particle sizes; and, FIGS. 3 and 4 are schematic views of additional stripping arrangements for effecting separation of the first and second catalyst components based primarily on differences in their particle densities; and, FIGS. 5 and 6 schematically illustrate preferred embodiments of a fluidized catalytic cracking process in accordance with this inventoion, i.e., one in which the second catalyst component defines a zone of concentration in an expanded, upper section of the riser and the stripping unit features means for separating the first and second catalyst components based primarily on differences in their average particle sizes and densities, such arrangement making it possible to selectively reactivate the second catalyst component and to reduce its exposure to the catalyst-degrading conditions of the regenerator zone.

As shown in FIG. 2 which is illustrative of a dual riser fluid catalytic cracking operation, a gas oil feed (Feed 1) is introduced to a first riser 4 by conduit 2, mixed with hot regenerated zeolite Y cracking catalyst in conduit 6 containing flow control valve 8 to form a suspension of catalyst particles in oil vapors which pass upwardly through the riser maintained at an elevated-temperature of at least about 1000° F. The individual particles of zeolite Y catalyst are appeciably smaller and less dense than the particles of ZSM-5 catalyst which is also utilized in the conversion process. Riser 4 discharges directly into a cyclone separator 14 housed in the upper portion of vessel 12. In cyclone separator 14, hot cracking catalyst is separated from hydrocarbon product of cracking. Separated hydrocarbon vapors pass into plenum chamber 16 and are removed therefrom by conduit 18 for separation in downstream equipment (not shown). Spent cracking catalyst separated in cyclone 14 is conveyed by dipleg 20 into catalyst bed 22. A conically shaped perforate plate or sieve 23 separates the larger, denser ZSM-5 catalyst particles from the zeolite Y catalyst particles, the latter passing through the sieve to the lower section 24 of the stripping zone. Stripping gas, in this case steam, is introduced through conduit 25 where it removes entrained hydrocarbon material from both catalyst components. The ZSM-5 catalyst particles gravitate toward the bottom of sieve 23 and eventually enter return conduit 30 provided with a source of low pressure steam 31 which blows smaller, less dense particles of zeolite Y catalyst which may have become entrained with the ZSM-5 catalyst particles back up into catalyst bed 22. Zeolite Y catalyst particles entering lower section 24 of the stripping zone are, following stripping, conveyed through one or more conduits 40 and 41 to the catalyst regeneration zone. Following regeneration, the zeolite Y catalyst is re-introduced to first riser 4 and/or second riser 10.

In second riser 10, a suspension of ZSM-5 catalyst of larger particle size and greater density than the zeolite Y catalyst particles and a charge stock different from Feed 1, e.g., a $C_3$-containing feed (Feed 2), introduced through conduit 3 is caused to be formed providing a mix temperature selected from within the range of 400° to 1000° F. and a ZSM-5 catalyst to charge stock ratio of from about 2:1 to about 10:1. The catalyst-hydrocarbon suspension thus formed is caused to move through riser 10 under conditions providing a catalyst contact time of from about 2 to about 20 seconds. The suspension of catalyst and hydrocarbon vapors continues to move upwardly through riser 10 and is discharged into one or more cyclonic separators 35 provided with dipleg 36. Separated catalyst enters bed 22 where it is separated into its ZSM-5 catalyst and zeolite Y catalyst components by the aforedescribed sieving operation, the conversion products meanwhile being combined with the other gaseous streams in plenum chamber 16 for transfer through conduit 18 to a downstream separation facility (not shown).

FIGS. 3 and 4 each describes the stripping section of a single riser fluidized cracking unit provided with means for separating particles of ZSM-5 catalyst from particles of zeolite Y catalyst based primarily upon the difference in the densities of these two types of catalyst components. The riser component of the fluidized cracking units shown in FIGS. 3 and 4 is of a preferred type, i.e., its cross-sectional geometry has been modified for a portion of its length so as to alter the linear velocity of the fluid stream in the modified region. The purpose of this feature is to further prolong the residency time of the ZSM-5 catalyst particles, which are both larger and of greater density than the zeolite Y catalyst particles, in the riser. Thus, as shown, the upward flow of the fluid stream containing gaseous conversion products and both catalyst components encounters an outwardly flared region 11 which contains a large percentage of the ZSM-5 catalyst particles of the mixed catalyst system. The ZSM-5 catalyst particles occupying this region possess a combinstion of density, average particle size and perhaps even shape such that the linear velocity of the suspension in this region which would tend to carry the ZSM-5 catalyst particles up and out of riser is in approximate balance with the settling rate of these particles. Such being the case, the ZSM-5 particles, or at least the bulk of them, remain more or less stationary, or suspended, in region 11 of riser 10 where they catalyze a variety of other conversions involving the hydrocarbons present in this region including selective cracking to light olefins such as $C_{3-6}$ olefins, oligomerization, alkylation, isomerization, aromatization, disproportionation, etc., the result of which is to provide a gasoline product of increased RON and MON. Meanwhile, the particles of spent catalyst zeolite Y, being less dense, smaller and/or more regular in shape than the ZSM-5 particles, continue past flared region 11 together with the gasiform products of conversion and are ultimately discharged from the top of the riser into one or more cyclonic separation zones adjacent the second riser discharge as represented by cyclone separator 14 provided with dipleg 20.

As previously indicated, although the ZSM-5 catalyst particles have an initially greater average particle size and density than that of the zeolite Y catalyst particles and therefore can be made to form a zone of concentration in the flared upper section 11 of riser 10, eventually they will become reduced in size due to the inevitable particle collisions which constantly take place in the system. As time goes, more and more of the ZSM-5 catalyst particles will enter catalyst bed 22 where, however, their higher density permits them to be separated by a variety of arrangements, two of which are shown in FIGS. 3 and 4.

As shown in FIG. 3, a mixture of comparatively dense particles of ZSM-5 and less dense particles of zeolite Y are conveyed from cyclone separator unit 14 via dipleg 20 to catalyst bed 22 residing within a vessel 26 provided with a source of stripping gas, e.g., steam, supplied through conduit 27 in the lower section thereof. Vessel 26 occupies an approximately central region of the stripping zone. The particles of ZSM-5 catalyst, being of greater density than the zeolite Y particles, tend to gravitate toward and concentrate at the bottom of vessel 26 and, following stripping, to enter return conduit 28 for return to riser 10. Meanwhile, the ascending current of stripping gas and desorbed hydrocarbonaceous material acts as a lift medium tending to carry the lower density particles of zeolite Y catalyst out of vessel 26 into an outer peripheral region 40 the lower section of which is provided with its own supply of stripping gas, again, e.g., steam, through conduit 41. Stripping gas and other gasiform material is separated from catalyst particles in cyclone separator 15, the former passing to plenum chamber 16 and the latter entering catalyst bed 22 via dipleg 17. Stripped, spent zeolite Y catalyst continues its downward flow movement and is withdrawn from the stripper through conduit 42 where it is conveyed to the regenerating zone. Similarly as in FIGS. 1A and 1B, a light olefin feed such as an ethylene-rich gas can be introduced through line 50 and, optionally, a supplemental feed stream such as $C_3$ and/or $C_4$ olefin can be introduced through line 51, to generate an exotherm which improves the efficiency of the stripping operation in vessel 26. Gasiform products from the riser and the stripping operations in vessel 26 and peripheral region 40 are ultimately conveyed to plenum chamber 16 and from there pass through conduit 18 to a downstream separation facility (not shown).

As shown in FIG. 4, descending catalyst bed 22 situated within an outer region of the stripping zone encounters streams of stripping gas, e.g., steam, introduced through conduits 27 and 28 which tends to lift the less dense particles of zeolite Y catalyst up concentrically arranged vertical conduits 60 and 61, respectively. The more dense particles of ZSM-5 catalyst continue to flow downwardly where they eventually enter return conduit 65 for return to riser 10. The source of stripping gas is advantageously placed below perforated baffles 67 so that the gas tends to force the less dense zeolite Y catalyst particles against baffles 68, the latter guiding the flow of the zeolite Y particles up conduits 60 and 61. The upper section of conduits 60 and 61 lead to one or more cyclone separators 70 and 71 which convey the separated spent zeolite Y particles through conduits 72 and 73 to the regenerator.

From the foregoing, it will be appreciated that due to the separation of ZSM-5 catalyst particles from zeolite Y catalyst particles in the stripper and, optionally, the comparatively prolonged residency time of particles of one of the catalyst components in the riser (preferably the ZSM-5 component), it is possible to have much of the ZSM-5 catalyst bypass the regenerator altogether. As a result, the ZSM-5 catalyst particles can be retained in the catalyst inventory at a high level of activity therein for a longer average period of time than would be the case were the circulation rate of the ZSM-5 catalyst particles the same as or similar to that of the zeolite Y catalyst particles.

Having thus provided a general discussion of the present invention and described specific embodiments in support thereof, it is to be understood that no undue restrictions are to be imposed by reasons thereof except as provided by the following claims.

What is claimed is:

1. A fluidized catalytic cracking (FCC) process wherein a feed contacts a conventionally sized FCC catalyst and an additive catalyst which has a slower deactivation rate then the conventional cracking catalyst in a conventional catalytic cracking riser reactor to produce cracked products, deactivated conventional catalyst and relatively less deactivated additive catalyst which are separated into a product fraction and a catalyst fraction, the catalyst fraction is stripped in a catalyst stripper to produce stripped catalyst which is then regenerated and returned to the riser reactor, and the product fraction passes through at least a final catalyst/vapor separation before discharge of cracked products, characterized by using an additive catalyst with different physical properties from the conventional catalyst and separating the additive catalyst from the conventional catalyst before the catalyst enters the regenerator and before the final catalyst/vapor separation and recycling the additive catalyst, without regeneration, to the catalytic cracking reactor and wherein said additive has a faster settling rate than the conventional FCC catalyst and the riser reactor has an upper section and a lower section and at least one of said sections has an enlarged diameter section relative to said riser and wherein said enlarged diameter section reduces the superficial vapor velocity and increases the residence time of said additive in said enlarged diameter section riser reactor.

2. The process of claim 1 further characterized in that the additive is separated from the conventional FCC catalyst in the catalyst stripper.

3. The process of claim 1 further characterized in that the additive has a different size than the conventional catalyst and the catalyst stripper has openings which separate, by sieving, additive from conventional catalyst.

4. The process of claim 1 further characterized in that the additive has a faster settling rate than the conventional FCC catalyst and additive is separated from conventional FCC catalyst in the stripper by elutriation.

5. The process of claim 1 further characterized in that the additive catalyst is pre-accelerated in the base of the riser reactor.

6. The process of claim 1 further characterized in that the reactor riser has an enlarged diameter upper section.

7. The process of claim 1 further characterized in that the reactor riser has an enlarged diameter lower section.

8. The process of claim 1 further characterized in that the additive comprises a zeolite selected from the group of zeolite beta, ZSM-5, ZSM-11, ZSM-12, ZSM-23, ZSM-35, ZSM-38 and ZSM-48.

9. The process of claim 1 further characterized in that the conventional cracking catalyst has an average particle size of about 20 to 150 microns and the average particle size of the additive ranges from about 500 to about 70,000 microns.

10. The process of claim 1 further characterized in that the conventional cracking catalyst has an average packed density of about 0.4 to about 1.1 $g/cm^3$ and the additive catalyst has an average packed density in excess of that of the conventional catalyst and ranging from about 0.6 to about 4.0 $g/cm^3$.

11. The process of claim 1 further characterized in that the conventional cracking catalyst has a coking rate and the additive catalyst comprises a matrix material having a coking rate which is higher than the coking rate of the conventional cracking catalyst.

* * * * *

UNITED STATES PATENT AND TRADEMARK OFFICE
CERTIFICATE OF CORRECTION

PATENT NO. : 4,871,446

DATED : October 3, 1989

INVENTOR(S) : Joseph A. Herbst, Hartley Owen and Paul H. Schipper

It is certified that error appears in the above-identified patent and that said Letters Patent is hereby corrected as shown below:

Col. 2, line 20: "zonek" should be --zone,--.

Col. 2, line 43: "ctalyst" should be --catalyst--.

Col. 3, line 16: "circulatiin" should be -- circulation--.

Col. 5, line 5: "ctalyst" should be --catalyst--.

Col. 5, line 33: "ctalyst" should be --catalyst--.

Col. 5, line 58: "inventoion" should be --invention--.

Col. 8, line 29: "componentof" should be --component of--.

Col. 9, line 24: "usful" should be --useful--.

Col. 10, line 40: "concentratiin" should be --concentration--.

Col. 14, line 9: "combinstion" should be --combination--.

Signed and Sealed this

Seventh Day of May, 1991

Attest:

HARRY F. MANBECK, JR.

Attesting Officer

Commissioner of Patents and Trademarks